United States Patent [19]

Nishumura et al.

[11] 3,852,719

[45] Dec. 3, 1974

[54] PITCH ERROR COMPENSATION SYSTEM

[75] Inventors: Hideo Nishumura; Kyosuke Haga, both of Kariya, Japan

[73] Assignee: Toyoda Koki Kabushiki Kaisha, Kariya-shi, Aichi-ken, Japan

[22] Filed: Sept. 24, 1973

[21] Appl. No.: 399,913

[30] Foreign Application Priority Data

Sept. 23, 1972 Japan............................ 47-95463

[52] U.S. Cl..... 340/172.5, 235/92 MP, 235/151.11, 318/632

[51] Int. Cl............................ G06f 3/00, G06f 15/46

[58] Field of Search............ 340/172.5; 235/151.11, 235/92 MP; 318/632

[56] References Cited
UNITED STATES PATENTS

| | | | |
|---|---|---|---|
| 3,353,161 | 11/1967 | Toscano.......................... | 340/172.5 |
| 3,394,291 | 7/1968 | Hill.................................. | 318/632 |
| 3,491,278 | 1/1970 | Stobbe............................. | 318/632 |
| 3,500,023 | 3/1970 | Arrowood et al.............. | 235/92 MP |
| 3,555,254 | 1/1971 | Gerber............................ | 235/151.11 |
| 3,668,377 | 6/1972 | Inoba et al..................... | 235/151.11 |
| 3,668,501 | 6/1972 | Chitayat.......................... | 318/632 |
| 3,704,641 | 12/1972 | Rhoades..................... | 235/151.11 X |
| 3,705,400 | 12/1972 | Cordes, Jr.................. | 235/151.11 X |

*Primary Examiner*—Gareth D. Shaw
*Assistant Examiner*—Melvin B. Chapnick
*Attorney, Agent, or Firm*—Oblon, Fisher, Spivak McClelland & Maier

[57] ABSTRACT

A machine tool is provided with a pulse motor adapted to move a movable member through a feed screw in accordance with numerical information including directional feed increments and compensating data therein. The compensating data consist of data pairs comprising a directional compensating unit distance and compensating position of the movable member. The directional compensating unit data is applied to compensate the pitch error of the feed screw. A pulse generating circuit produces a train of pulses to be transmitted to the pulse motor operable to move the movable member a unit distance for each pulse applied thereto. A presettable counter circuit terminates the application of pulses to the pulse motor after receiving a predetermined number of pulses corresponding to the directional incremental feed amount preset thereto. Selecting circuit means selects compensating data within the feed range of the movable member according to the directional incremental feed amount. Counter means sums the directional compensating unit distances of the selected compensating data to transmit compensating pulses to the presettable counter circuit.

2 Claims, 3 Drawing Figures

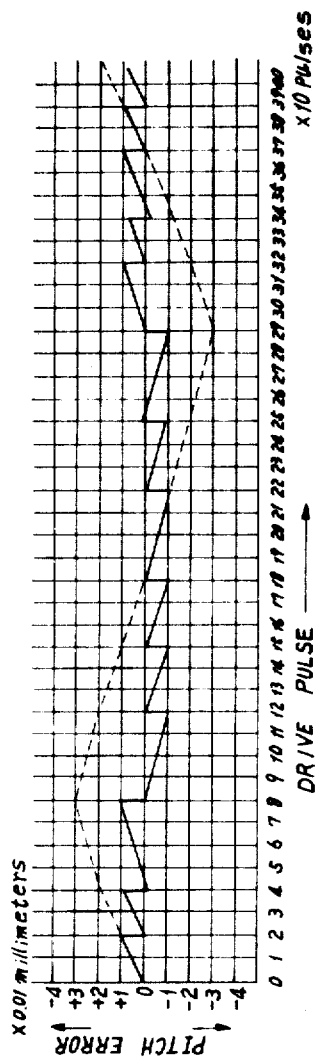

PITCH ERROR COMPENSATION SYSTEM

BACKGROUND OF THE INVENTION

1. Field of the Invention

The present invention generally relates to control systems, and more particularly to a unique control system for numerically compensating the pitch error of a feed screw used in a numerical control machine tool

2. Description of the Prior Art

In the past, numerical control machine tools had a problem whereby positioning accuracy of a slide such as a work table, a spindle head or the like was adversely affected by the pitch error of the feed screw. Prior to the present invention, the pitch error was mechanically compensated by means of switches and dogs.

While generally somewhat satisfactory, the mechanical pitch error compensating system of the past could not, without great difficulty, accurately compensate the pitch error of a feed screw. In high precision machine tools, the machining accuracy of a workpiece was required to be extremely high but a desired high machining accuracy could not be attained unless the pitch error was repeatedly compensated at every minute feed of the slide.

SUMMARY OF THE INVENTION

Accordingly, one object of the present invention is to provide a new and improved unique pitch error compensation system for accurately compensating the pitch error of a feed screw.

It is another object of the present invention to provide a new and improved unique pitch error compensation system which is adequate for a "point-to-point control" wherein the pitch error of a feed screw is numerically compensated in accordance with compensating data of the feed screw.

Still another object of the present invention is to provide a new and improved unique pitch error compensation system which is electrically operable to accurately compensate the present feed amount of a movable member in accordance with a total pitch error which is derived by compensating data of a feed screw.

Briefly, in accordance with this invention, these and other objects are in one aspect attained by providing a pitch error compensation system for a machine tool provided with a pulse motor adapted to move a movable member through a feed screw in accordance with numerical information, the information including directional incremental feed amounts and compensating data therein. The compensating data further consist of data pairs comprising directional compensating unit distance and compensating position of the movable member. The directional compensating unit distance is applied to compensate the pitch error of the feed screw. A pulse generating circuit produces a train of pulses to be transmitted to the pulse motor. The pulse motor operates to move the movable member a unit distance for each pulse applied thereto. A presettable counter circuit terminates the application of pulses to the pulse motor after it receives a predetermined number of pulses corresponding to the amount of directional incremental feed preset thereto. Selecting circuit means selects compensating data within the feed range of the movable member according to the directional incremental feed amount. Counter means sums the directional compensating unit distances of the selected compensating data to transmit compensating pulses to the presettable counter circuit.

BRIEF DESCRIPTION OF THE DRAWINGS

The foregoing and other objects of the present invention will be more fully appreciated as the same becomes better understood by reference to the following detailed description when considered in connection with the accompanying drawings, wherein:

FIG. 2 is a graph showing accumulated pitch errors before and after the compensating operation; and FIG. 3 shows compensation tables of pitch error.

DESCRIPTION OF A PREFERRED EMBODIMENT

Figure 1:
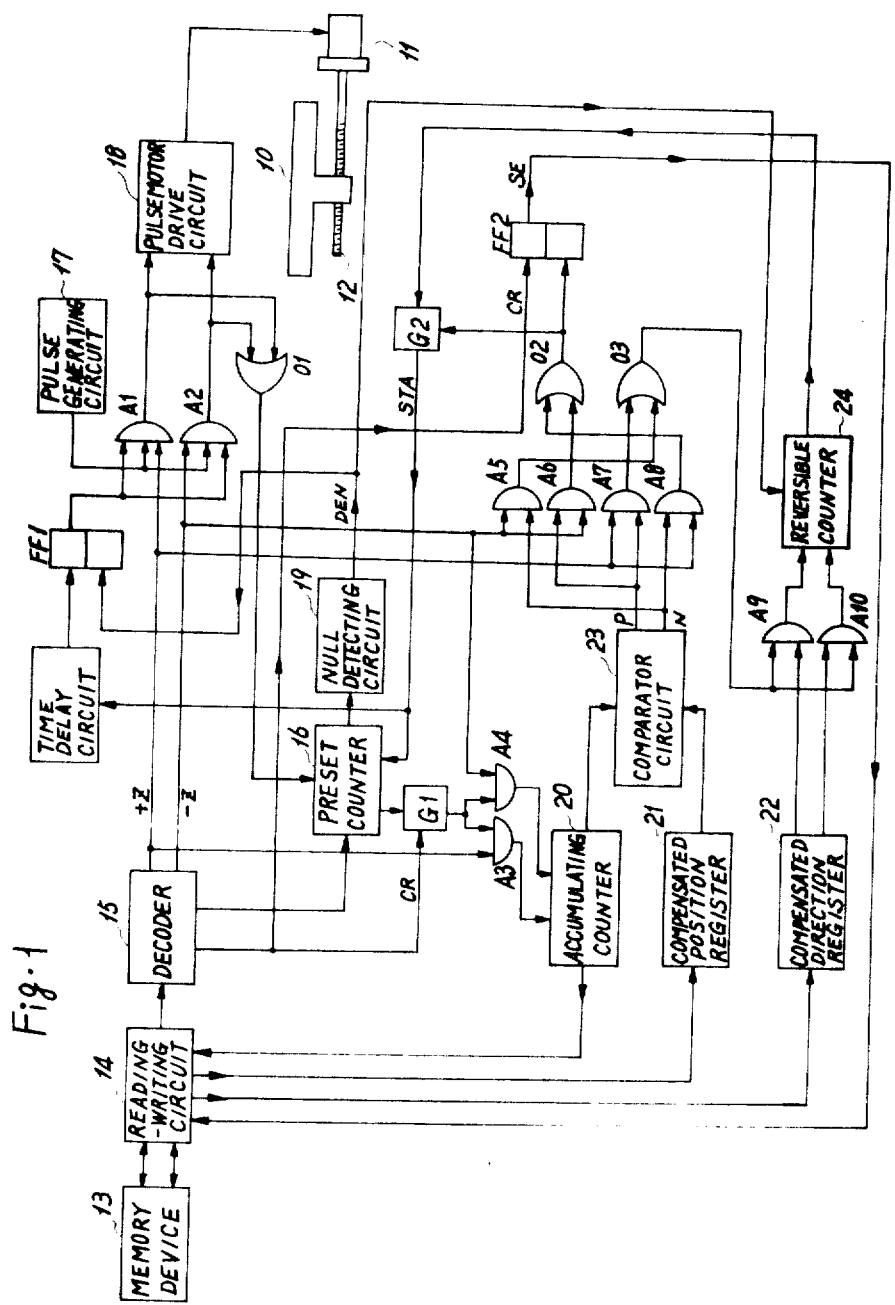
FIG. 1 is a block diagram showing an apparatus for compensating the pitch error of a feed screw used in numerical control machine tools.

Referring now to the drawings, wherein like reference numerals designate identical, or corresponding parts throughout the several views, and more particularly to FIG. 1, a slide 10, such as a work table, a wheel slide or the like of a numerical control machine tool, is drivingly engaged with a feed screw 12. The feed movement of the slide 10 is controlled by an electrohydraulic pulse motor 11 which drives the feed screw 12 in accordance with drive pulses applied thereto. The drive pulses are, in turn, applied in accordance with numerical control data including incremental feed amount and feed directions thereof which are coded on a punched tape.

The pitch errors of the feed screw 12 are measured in a manner such that an actual distance through which the slide 10 is shifted from a predetermined origin is measured by a precise measuring device such as a laser device. This measured shaft is then compared with a theoretical distance corresponding to the number of drive pulses which are actually applied to the electrohydraulic pulse motor 11 in order to feed the slide 10. For example, if the slide 10 is adapted to be moved 0.01 millimeter each time one drive pulse is applied to the pulse motor 11, a pitch error of + 0.01 millimeter occurs when the slide is actually shifted 0.21 millimeters relative to the theoretical distance of 0.20 millimeters which corresponds to 20 drive pulses. Furthermore, an accumulated pitch error + 0.03 millimeters occurs when the slide 10 is actually moved 0.83 millimeters from the origin relative to the theoretical distance of 0.80 which corresponds to 80 accumulated drive pulses, as shown by the dotted line in FIG. 2.

As shown in table (A) of FIG. 3 which corresponds to the solid line of FIG. 2, compensation of every one pulse (0.01 millimeter) is performed at each position corresponding to an accumulated 20, 40, 80, —drive pulses (selected in accordance with the results of pitch error measurement) compared with the occurrences of the aforementioned pitch errors of the feed screw 12. For example, one pulse designated by a sign "—" is subtracted from the 21 pulses corresponding to the actually shifted distance of 0.21 millimeters and one pulse designated by a sign "+" is added to the 122 pulses corresponding to the actually shifted distance of 1.22 millimeters (dotted line).

Thus, the positioning accuracy of the slide 10 is insured to ± 0.01 millimeter at any position within the range of feed movement of the slide 10. However, the pitch error is only compensated relative to the accumulated value of drive pulses in the above-mentioned compensation. It is necessary, therefor, to compensate the pitch error of the feed screw 10 relative to the actual feed amount of the slide 10 with respect to the origin in the execution of compensation of the pitch error. As mentioned above, when 20 drive pulses are applied to the pulse motor 11, the slide 10 is actually shifted 0.21 millimeters which theoretically corresponds to 21 drive pulses from the origin, as shown by the dotted line of FIG. 2. Similarly, when 40 drive pulses are applied, the slide 10 is actually shifted 0.42 millimeters which theoretically corresponds to 42 drive pulses. Therefore, a slide displacement amount of 20 pulses is developed by subtracting one drive pulse from the 21 drive pulses. Similarly, the slide displacement amount of 41 pulses is developed by subtracting one drive pulse from the 42 drive pulses. Thus, a compensation table of pitch error with respect to the actual feed amount of the slide 10 is made, as shown in the (B) of FIG. 3. The compensating data of pitch error of the feed screw 12, shown in the table (B) of FIG. 3, are registered at a predetermined address of a memory device 13.

The numerical control data are read out by a reading-writing circuit 14 from the memory device 13, as is well known to those skilled in the art. The read out control data are written again at the original address thereof in the memory device 13 by the reading-writing circuit 14. The reading-writing circuit 14 reads out the numerical control data in order from the memory device in accordance with a predetermined program to transmit the numerical control data to a decoder 15 when the control data are requested by the machine tool. The decoder 15 presets the control data corresponding to the feed amount of the slide 10 contained in the applied numerical control data at a preset counter 16. The feed direction instructions of the slide 10 consist of feed instructions of a positive direction +Z and a negative direction −Z. The decoder 15 is connected in order to transmit the instruction of the positive feed direction +Z to AND gates A1, A3, A7 and A8 and to transmit the instruction of the negative feed direction −Z to AND gates A2, A4, A5 and A6. A pulse generating circuit 17 is connected to the AND gates A1 and A2 which receive a set signal from a flip-flop circuit FF1. The flip-flop circuit FE1 is set by a pulse distribution start signal STA with a delay from a time delay circuit. The flip-flop circuit FF1 is reset by a pulse distribution terminating signal DEN. When the feed direction of the slide 10 is in the positive feed direction +Z under the set state of the flip-flop circuit FF1, the pulses which are transmitted by the pulse generating circuit 17 are applied to the positive input terminal of a pulse motor drive circuit 18 through the AND gate A1. Meanwhile, when the feed of the slide 10 is in the negative direction −Z, the pulses are applied to the negative input terminal of the pulse motor drive circuit 18 through the AND gate A2. The pulse motor drive circuit 18 causes the electro-hydraulic pulse motor 11 to rotate a unit angle in the clockwise or counterclockwise direction each time one pulse is applied thereto, thus controlling the feed direction and the feed amount of the slide 10 through the feed screw 12.

The pulses which are applied to the pulse motor drive circuit 18 are also applied to the preset counter 16 through an OR gate O1. The preset value of the preset counter 16 is decreased by one each time one pulse is applied to the preset counter 16. When the content of the preset counter 16 reduces to a null, a null detecting circuit 19 detects the null to thereby transmit the pulse distribution terminating signal DEN to the reset input terminal of the flip-flop circuit FF1.

When a gate circuit G1 is opened in response to a carriage-return instruction CR which is transmitted from the decoder 15 and the feed direction of the slide 10 is directed in the positive Z directions, the value of the preset counter 16 is applied to the addition input terminal of an accumulating counter 20 through the AND gate A3. Meanwhile, the value of the preset counter 16, is applied to the subtraction input terminal of the accumulating counter 20 through the AND gate A4 when the feed direction of the slide 10 is directed in the negative Z direction. Thus, each time the feed amount of the slide 10 is preset at the preset counter 16, the accumulating counter 20 counts the distance from the standard origin or the absolute position of the slide 10 by an addition or subtraction operation of the preset value.

The carriage-return instruction is then applied to the set-terminal of a flip-flop circuit FF2 to thereby set the flip-flop circuit FF2. A search signal SE is generated in response to the setting of the flip-flop circuit FF2 to be transmitted to the reading-writing circuit 14, and the actual position of the slide 10 is stored in the accumulating counter 20 before accumulating the preset value of the preset counter 16. An address of the data to be first read out from the compensation table of pitch error of the feed screw 12 is instructed in accordance with the contents of the accumulating counter 20 which indicates the actual position of the slide 10. The reading-writing circuit 14 reads out the data of the compensation table of pitch error in the instructed address in order along with the feed direction of the slide 10. In the data which are read out by the reading-writing circuit 14, a numerical value designating the compensated position of pitch error is in order applied to a compensated position register 21 and a direction sign designating the compensated direction of pitch error and one compensating pulse is in order applied to a compensated direction register 22. The direction sign is adapted to be applied to the compensated direction register 22 slightly delayed relative to the timing with which the numerical value opposed thereto is applied to the compensated position register 21.

The numerical value of the compensated position register 21 is applied to a comparator circuit 23. The contents of the accumulating counter 20 are applied to the comparator 23 to be compared with the contents of the compensated position register 21. When the contents of the accumulating counter 20 are greater than those of the compensated position 21, a first signal P is transmitted from the comparison circuit 23 to be applied to AND gates A6 and A7. On the contrary, when the contents of the accumulating counter 20 are less than those of the compensated position register 21, a second signal N is transmitted from the comparison circuit 23 to be applied to AND gates A5 and A8. The other input terminals of AND gates A7 and A8 are connected to the decoder 15 in order to receive the feed instruction of the positive feed direction of the slide 10. The feed instruction of the negative feed direction is applied to the other input terminals of AND gates A5 and A6.

Each output terminal of AND gates A6 and A8 is connected to the reset terminal of the flip-flop circuit FF2 through an or gate 02 to reset the same and is simultaneously applied to a gate circuit G2 to open the same. Each output of AND gates A5 and A7 is connected to the input terminals of AND gates A9 and A10 through an OR gate 03. The other input terminals of AND gates A9 and A10 are connected to the compensated direction register 22. The output terminals of AND gates A9 and A10 are connected to a reversible counter 24. When the direction sign designating the compensated direction of pitch error which is applied to the compensated direction register 22 is positive, it is applied to the addition input terminal of a reversible counter 24 through the AND gate A9. However, when the direction sign is negative, the direction sign is applied to the subtraction input terminal of the reversible counter 24 through the AND gate A10. Thus, the reversible counter 24 counts the total value of the compensated signs of pitch error which are applied thereto. The counted value of the reversible counter 24 is connected to the preset counter 16 through the gate circuit G2 to compensate the preset value of the preset counter in accordance with the pitch error.

The control operation of the preferred embodiment will now be described. For convenience, movements will be described in which the slide 10 is first fed 3.50 millimeters (350 pulses) in the positive feed direction from the origin to a first position and in turn is then fed 1.20 millimeters in the negative feed direction from the first position to a second position which is at a distance 2.30 millimeters from the origin.

When a start signal is applied to the reading-writing circuit 14, the numerical control data coded on a first block of the punched tape are read out by the reading-writing circuit 14 from the memory device 13 and in turn are identified by the decoder 15. The feed instruction value 350 of the slide 10 is transmitted from the decoder 15 to the preset counter 16 to be preset therein. The feed instruction of the positive feed direction +Z is applied to AND gates A1, A3, A7 and A8. After reading out the first data block, the carriage return signal CR is applied to the gate circuit G1 and to the set input terminal of the flip-flop circuit FF2. Then, the gate circuit G1 is opened, so that the feed instruction value 350 is fed to the accumulating counter 20 to be accumulated therein. The flip-flop circuit FF2 is set to generate a search signal SE to search the compensation table of pitch error. Although, the contents of the accumulating counter 20 turns to 350, the previous contents 0 (the actual position of the slide 10) of the accumulating counter 20 has been stored in the reading-writing device 14.

The search signal SE is then applied to the reading-writing circuit 14, which, thereby, reads out the data contained in the compensation table of pitch error from the memory device 13 in accordance with the feed instruction of the positive feed direction +Z of the slide 10 considering the contents 0 of the accumulating counter 20 stored therein to be a standard origin. Numerical values 20, 41, 82, 123, — in the read-out data are applied in order at constant intervals of time to the compensated position register 21, while signs "—," "—," "—," "+," — opposed respectively to the above-mentioned numerical values are applied in order and slightly delayed to the compensated direction register 22.

In the initial state, since the accumulated value of the accumulating counter 20 is larger than the numerical value which is applied to the compensated position register 21, the first signal P is transmitted from the comparator circuit 23 to AND gates A9 and A10 through the AND gate A7 and the OR gate 03. Accordingly, when a plus sign "+" is applied to the compensated direction register 22, the plus sign is applied to the addition input terminal of the reversible counter 24 through the AND gate A9 to thereby bring an additional operation to the counter 24. Similarly, when a minus sign "—" is applied to the compensated direction register 22, the minus sign is applied to the subtraction input terminal of the reversible counter 24 through the AND gate A10 to thereby bring a subtraction operation to the counter 24. Thus, the reversible counter 24 counts the total of signs which are applied to the compensated direction register 22.

When the numerical value 369 following the numerical value 338 is applied to the compensated position register 21, the numerical value 369 which is applied to the compensated position register 21 becomes larger than the accumulated value 350 of the accumulating counter 20, so that a second signal N is transmitted from the comparator circuit 23 to the reset terminal of the flip-flop circuit FF2 through the AND gate A8 and the OR gate 02 to thereby reset the flip-flop circuit FF2 and open the gate circuit G2. When a search of the compensation table of pitch error is completed, the total count value of the reversible counter 24 or compensating pulses is applied to the preset counter 16 through the opened gate circuit G2. In the preset counter 16, the preset value 350 is compensated in accordance with the total count value of pitch error.

Although the minus sign "—" associated with the numerical value 369, FIG. 3, is applied to the compensated direction register 22 slightly after the application of the numerical value 369 to the position register 21, the minus sign "—" is rendered invalid since the AND gates A9 and A10 are blocked by the change of signals P and N which are transmitted from the comparator circuit 23 earlier.

Accordingly, the total amount "+1" of pitch error in the feed range of the slide 10 is applied to the preset counter 16 through the opened gate circuit G2 to compensate the preset value 350 to 351, since there are six compensation positions of pitch error of the positive feed direction and five compensation positions of pitch error of the negative feed direction between the positions of 3.50 millimeters and the standard origin of feed control of the slide 10.

When the counted value of the reversible counter 24 is applied to the preset counter 16, the pulse distribution start signal STA is generated and is applied to the set terminal of the flip-flop circuit FF1 through the time delay circuit to set the flip-flop circuit FF1. Accordingly a train of pulses which is transmitted from the pulse generating circuit 17 is applied to the electro-hydraulic pulse motor 11 through the ANd gate A1 and the pulse motor drive circuit 18 to control the feed of the slide 10 by rotating the feed screw. Also, the train of pulses which is transmitted from the pulse generating circuit 17 is applied to the preset counter 16 through the AND gate A1 and the OR gate 01. The contents of the preset counter 16 are subtracted in order each time one pulse is applied to the preset counter 16.

When the 351st pulse is applied to the preset counter 16 and the electro-hydraulic pulse motor 11, the contents of the preset counter 16 turn to a state 0, which is detected by the null detecting circuit 19. Then, the null detecting circuit 19 generates the pulse distribution completion signal DEN. The flip-flop circuit FF1 is reset in response to the pulse distribution-terminating signal DEN to block the pulses from the pulse generating circuit 17 at the AND gate A1, thus stopping the feed movement of the slide 10. The pulse distribution-terminating signal DEN is further applied to the reversible counter 24 to clear the contents of the reversible counter 24.

In turn, the numerical control data of the second data block are read out by the reading-writing circuit 14 from the memory device 13. The feed instruction value 120 with a negative sign is transmitted to the preset counter 16. When the carriage-return instruction CR is transmitted from the decoder 15 to the flip-flop circuit FF2 and to the gate circuit G1, the flip-flop circuit FF2 is set to thereby generate the search signal SE and the preset value 120 of the preset counter 16 is applied to the accumulating counter 20 through the gate circuit G1 and the AND circuit A4, so that the accumulated value of the accumulating counter 20 is changed to 230. The reading-writing circuit 14 reads out in order necessary data 338−, 317−, 288+ — from the compensation table of pitch error of the memory device 13 with reference to the previous accumulated value 350 under a receipt of the search signal SE. The read out data are applied in order to the compensated position register 21 and the compensated direction register 22. While the numerical value applied to the compensated position register 21 is larger than the accumulated value 230 of the accumulating counter 20, the reversible counter 24 makes an addition or a subtraction operation in response to the signs which are applied to the compensated direction register 22 since the second signal N of the comparator circuit 23 is applied to AND gates A9 and A10 through the AND gate A5 and the OR gate 03.

When a numerical value 220, less than the accumulated value 230, is applied to the compensated position register 21, the flip-flop circuit FF2 is reset by the first signal P of the comparator circuit 23 and simultaneously the counted value of the reversible counter 24 is applied to the preset counter 16 through the gate circuit G2. In this case, however, the counted value of the reversible counter 24 is turned to a state 0 whereby the preset value 120 of the preset counter 16 is not compensated, because the compensation positions in the positive and negative feed directions are of the same number.

According to the present invention, as mentioned above, the total pitch error within the feed range of the slide is previously set up to compensate in response thereto the preset value of the preset counter setting the feed amount of the slide, and the feed of the slide is controlled in accordance with the compensated preset value. In comparison with the conventional manner in which compensation pulses are generated at every compensation position of pitch error, the device according to the present invention has advantages and characteristics which permit accurate compensation of the pitch error because conventional mechanical elements are not used.

Although certain specific embodiments of the invention have been shown and described, it is obvious that many modifications and variations thereof are possible in light of the above teachings. For example, the total pitch error may be set up by reading out the necessary data from the compensation table of pitch error within a computer in accordance with the actual position of the slide, the feed amount and the feed direction instructions of the slide.

What is claimed as new and desired to be secured by Letters Patent of the United States is:

1. A pitch error compensation system for a machine tool provided with a pulse motor adapted to move a movable member through a feed screw and a pulse generator for producing a train of pulses to be applied to said pulse motor in accordance with numerical information, comprising:

memory means for storing said numerical information including control data to instruct incremental feed amounts of said movable member and compensating data used to compensate the positioning error of said movable member therein, said compensating data consisting of data pairs of compensating directions and compensating positions determined as positions where said positioning error changes in magnitude beyond a predetermined unit amount of positioning error;

presettable counter means for registering an incremental feed amount supplied from said memory means;

accumulating counter means for indicating an absolute position of said movable member in accordance with said incremental feed amount;

position detecting means responsive to said memory means for registering said compensating positions;

direction detecting means responsive to said memory means for registering said compensating directions;

comparator means for comparing contents in said accumulating counter means and said position detecting means to select compensating directions between the absolute position of said movable member and a predetermined origin; and summing counter means responsive to said direction detecting means and said comparator means for detecting a positioning error for said incremental feed amount in accordance with the selected compensating directions, said presettable counter means being responsive to said summing counter means for modifying said registered incremental feed amount in accordance with said positioning error.

2. A pitch error compensation system according to claim 1, wherein said presettable counter means is connected to said summing counter means for clearing the contents of said summing counter means after said movable member is moved by the modified incremental feed amount.

* * * * *